United States Patent
Zhou et al.

(10) Patent No.: US 10,013,517 B1
(45) Date of Patent: Jul. 3, 2018

(54) HIGH LEVEL PROGRAMMING LANGUAGE CORE PROTECTION FOR HIGH LEVEL SYNTHESIS

(71) Applicant: Xilinx, Inc., San Jose, CA (US)

(72) Inventors: Sheng Zhou, San Jose, CA (US); Bin Ochotta, Mountain View, CA (US); Alec J. Wong, San Jose, CA (US); Pradip K. Jha, Cupertino, CA (US); Qin Zhang, Beijing (CN)

(73) Assignee: XILINX, INC., San Jose, CA (US)

( * ) Notice: Subject to any disclaimer, the term of this patent is extended or adjusted under 35 U.S.C. 154(b) by 88 days.

(21) Appl. No.: 14/989,683

(22) Filed: Jan. 6, 2016

(51) Int. Cl.
G06F 17/00 (2006.01)
G06F 17/50 (2006.01)

(52) U.S. Cl.
CPC .................. *G06F 17/505* (2013.01)

(58) Field of Classification Search
USPC ........................................... 716/102
See application file for complete search history.

(56) References Cited

U.S. PATENT DOCUMENTS

| | | | | |
|---|---|---|---|---|
| 2003/0039355 A1* | 2/2003 | McCanny | ........... | G06F 17/5045 380/37 |
| 2004/0044967 A1* | 3/2004 | Okuda | ..................... | G06F 17/50 716/102 |
| 2006/0075374 A1* | 4/2006 | McElvain | ........... | G06F 17/5045 716/116 |
| 2015/0106774 A1* | 4/2015 | Yasunaka | .............. | G06F 17/505 716/102 |
| 2015/0347107 A1* | 12/2015 | Munshi | ..................... | G06F 8/47 717/147 |

* cited by examiner

*Primary Examiner* — Mohammed Alam
(74) *Attorney, Agent, or Firm* — Kevin T. Cuenot (57) ABSTRACT

High level synthesis for a circuit design may include detecting, using a processor, an encrypted, high level programming language (HLL) core for inclusion in a circuit design, decrypting, using the processor, the encrypted HLL core into volatile memory, and generating, using the processor, an encrypted, intermediate representation (IR) of the circuit design including an encrypted IR of the HLL core. An encrypted hardware description language (HDL) circuit design may be generated, using the processor, from the encrypted IR of the circuit design. The encrypted HDL circuit design includes an encrypted HDL core that is functionally equivalent to the encrypted HLL core.

20 Claims, 3 Drawing Sheets

HIGH LEVEL PROGRAMMING LANGUAGE CORE PROTECTION FOR HIGH LEVEL SYNTHESIS

FIELD OF THE INVENTION

This disclosure relates to electronic system design, and, more particularly, to protecting high level programming language cores for high level synthesis.

BACKGROUND

When designing electronic systems, hardware designers routinely utilize portions of predesigned circuitry referred to as "cores." The cores are typically specified in a hardware description language (HDL). A hardware designer may use one or more cores licensed from third party core developers to create the electronic system. The cores are often used in combination with one or more other portions of user specified circuitry that may also be specified in HDL.

The cores are usually protected to prevent unauthorized usage of the cores and to hide implementation details of the cores from hardware designers. For example, a core may be provided as a black box where the hardware designer is provided with limited information about the core. The hardware designer may be provided with information such as the types of inputs that may be provided to the core, the types of outputs that may be generated by the core, and other operational aspects of the core relating to timing, power consumption, and the like. The specific HDL source code and circuitry specified by the core, i.e., the internal workings, are usually hidden from the hardware designer.

Modern electronic system design has embraced the use of high level programming languages (HLLs) such as C and/or C++. To meet the growing demand for hardware design using HLLs, protection is needed for HLL cores that secures the HLL cores for core developers and also facilitates usage of the HLL cores in electronic systems.

SUMMARY

A method of high level synthesis for a circuit design may include detecting, using a processor, an encrypted, high level programming language (HLL) core for inclusion in a circuit design, decrypting, using the processor, the encrypted HLL core into volatile memory, and generating, using the processor, an encrypted, intermediate representation (IR) of the circuit design including an encrypted IR of the HLL core. An encrypted hardware description language (HDL) circuit design may be generated, using the processor, from the encrypted IR of the circuit design. The encrypted HDL circuit design includes an encrypted HDL core that is functionally equivalent to the encrypted HLL core.

A system for high level synthesis of a circuit design includes a processor programmed to initiate executable operations. The executable operations may include detecting an encrypted HLL core for inclusion in a circuit design, decrypting the encrypted HLL core into volatile memory, and generating an encrypted IR of the circuit design including an encrypted IR of the HLL core. An encrypted HDL circuit design may be generated from the encrypted IR of the circuit design. The encrypted HDL circuit design includes an encrypted HDL core that is functionally equivalent to the encrypted HLL core.

A method of protecting an HLL core may include generating, using a processor, a session key, encrypting, using the processor, the HLL core using the session key, encrypting, using the processor, the session key using a public key, and including, using the processor, the encrypted session key within the encrypted HLL core.

A system for protecting an HLL core may include a processor programmed to initiate executable operations. The executable operations may include generating a session key, encrypting the HLL core using the session key, encrypting the session key using a public key, and including the encrypted session key within the encrypted HLL core.

A non-transitory computer-readable medium may have instructions stored thereon which, when executed by a processor, perform the various methods described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic system design, and, more particularly, to protecting high level programming language cores for high level synthesis. In accordance with the inventive arrangements described within this disclosure, cores may be specified in a high level programming language (HLL). The cores may include usage rights. The HLL cores, including the usage rights, may be encrypted and provided in encrypted form to hardware designers for use in creating an electronic system.

The encrypted HLL cores may be used safely within an electronic design automation (EDA) system for inclusion in a circuit design. The circuit design, including the encrypted HLL core, may be converted into an HDL circuit design, whereby the HLL core is effectively transformed into an HDL core. The HDL circuit design may be encrypted. The particular usage rights initially associated with the encrypted HLL core may be propagated through the transformation for inclusion within the HDL core of the HDL circuit design. As the circuit design is manipulated, altered, simulated, tested, and/or implemented, the usage rights for the resulting HDL core may be enforced by the system.

The inventive arrangements described herein may be implemented as methods or processes for protecting HLL cores for high level synthesis as performed by a data processing system. In another aspect, the inventive arrangements may be implemented as a data processing system having a processor programmed to initiate executable operations relating to protecting HLL cores for high level synthesis. In still another aspect, the inventive arrangements may be implemented as a non-transitory computer-readable storage medium storing program code that, when executed, causes a processor and/or a system to perform a method relating to protecting HLL cores for high level synthesis.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
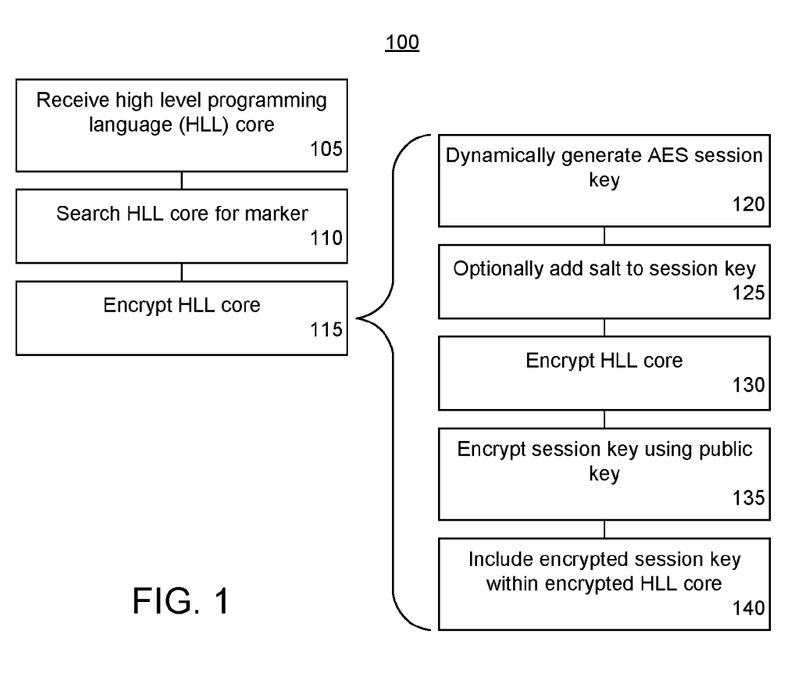
FIG. 1 is a flow chart illustrating an exemplary method of protecting a high level programming language (HLL) core for high level synthesis.

FIG. 1 is a flow chart illustrating an exemplary method 100 of protecting an HLL core for high level synthesis. The operations illustrated in FIG. 1 may be performed by a data processing system executing a compiler. The compiler may be part of a larger application such as an electronic design automation (EDA) application that is suited for performing high level synthesis.

In one arrangement, method 100 may illustrate exemplary processing that may be performed by a data processing system of a developer of a core specified in an HLL (e.g., a core developer). Method 100 may be performed as part of a security solution for core developers to encrypt cores for use by hardware designers also referred to herein as "hardware application developers."

In block 105, the system may receive an HLL core. The HLL core may be specified in any of a variety of HLLs such as C or C++ as source code. Within the source code, the HLL core may include a marker. In one arrangement, the marker may indicate that the HLL core is to be protected. In addition, the marker may specify one or more usage rights for the HLL core.

In one aspect, a user such as a core developer may provide an instruction to the system that identifies the HLL core and that instructs the system to protect the HLL core. In another aspect, the core developer may provide an instruction to the system that identifies the HLL core. The system, in response to the received input, may automatically evaluate the HLL core for the existence of a marker and implement the protection operations described herein automatically responsive to detecting the marker within the HLL core.

In block 110, the system may search the source code of the HLL core for the marker. The marker may be specified in any of a variety of different ways. In one arrangement, the marker may be implemented within the HLL core as a compiler directive. For example, the compiler directive may be specified as a pragma. In still another arrangement, the marker may be specified as a predefined bit pattern, a symbol, a group of symbols, or the like with usage rights following.

Exemplary usage rights for the HLL core that may be specified by the marker may include, but are not limited to, rights for using the HLL core for functional simulation, rights for using the HLL core for timing simulation, rights for using the HLL core for production, rights to include the HLL core in a circuit design that may result in a configuration bitstream or other form that may be used to program or implement circuitry within an IC, rights to view a block level diagram of the HLL core, rights to view more detailed circuitry of the HLL core, and/or rights for programming a programmable IC to perform hardware validation using the HLL core with no timeout period.

In block 115, the system may encrypt the HLL core. In one aspect, the system may encrypt the HLL core responsive to detecting the marker from the searching of block 110. In encrypting the HLL core, the system may generate an encrypted HLL core. The encrypted HLL core may also include the marker. The marker within the encrypted HLL core still may specify the usage rights. As such, any usage rights specified by the marker are also specified for the resulting encrypted HLL core.

Blocks 120-140 illustrate exemplary operations for performing block 115 of FIG. 1. In one arrangement, the system may encrypt the HLL core using a dynamically generated session key. Accordingly, in block 120, the system may dynamically generate a session key. The session key may be a dynamically generated AES (Advanced Encryption Standard) session key.

In block 125, the system may optionally add a salt to the session key. As is generally known in the art, a "salt" refers to random data that may be used as an additional input to a one-way function that hashes, or encrypts, a password or passphrase. The salt may be used to defend against various types of attacks such as dictionary attacks and pre-computed rainbow table attacks.

In block 130, the system may encrypt the HLL core using the session key. In block 135, the system may encrypt the session key using a public key. The public key may be an RSA (Rivest-Shamir-Adleman) public key. In block 140, the system may then include the encrypted session key within the encrypted HLL core. For example, the system may embed the encrypted session key within the encrypted HLL core. The encrypted session key may be included within the encrypted HLL core at a predetermined location or subdivided with portions of the encrypted session key being embedded at multiple, different predetermined locations within the encrypted HLL core.

Figure 2:
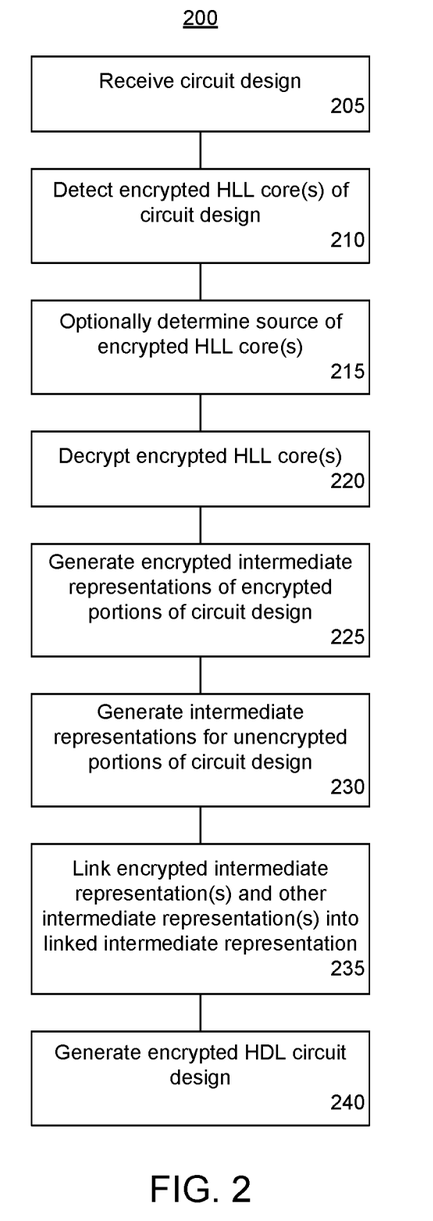
FIG. 2 is a flow chart illustrating an exemplary method of handling an HLL core for high level synthesis.

FIG. 2 is a flow chart illustrating an exemplary method 200 of handling an HLL core for high level synthesis. The operations illustrated in FIG. 2 may be performed by a data processing system (not shown) executing a compiler. FIG. 2 may illustrate exemplary processing that may be performed by a data processing system of an application developer, e.g., a user, using an encrypted HLL core.

In block 205, the system may receive a circuit design as input. The circuit design may include an encrypted HLL core such as one generated as described with reference to FIG. 1. The circuit design may include one or more other files. The other files may be additional encrypted HLL cores, unencrypted HLL cores, user generated or specified HLL source code files, HDL files, HDL cores, or the like.

In block 210, the system may detect encrypted HLL core(s) of the circuit design. For example, the system may distinguish between encrypted and unencrypted HLL cores within the circuit design. In one arrangement, the system may evaluate the first N bytes of the files of the circuit design, where "N" is an integer value. In one aspect, the value of N may be 8, however, the inventive arrangements described within this disclosure are not intended to be limited by the particular value of N. The value of N may be less than 8 or greater than 8. The first N bytes of the files of the circuit design may indicate whether the file is an encrypted HLL core or not. In one aspect, for example, even in the case of an encrypted HLL core, the first N bytes may not be encrypted and may provide information such as a version number of the HLL core, or the like. The version number may indicate whether the file is an encrypted HLL core. In another aspect, one or more other attributes of the first N bytes may designate the file as an encrypted HLL core.

In block 215, the system may optionally determine the source of the encrypted HLL core. For example, the system may determine whether the core is a native encrypted HLL core or an encrypted HLL core that originated from a third party core developer. A native core is a core that is developed by the same entity that developed the operational software of the system, e.g., the EDA application and/or compiler. In one aspect, the system may determine the source of the HLL core according to the version number specified within the first N bytes. In one arrangement, the system may apply different processing, e.g., different decryption processing, based upon the identified source of the encrypted HLL core. In another arrangement, the system may adjust, or modify, one or more usage rights of the encrypted core according to the determined source.

In block 220, the system may decrypt the encrypted HLL core(s). The system may decrypt the encrypted HLL core(s) determined in block 210 into volatile memory. The system, for example, may not write the HLL core in unencrypted form to non-volatile memory in order to maintain protection. Accordingly, the decrypted HLL core(s) may remain in program execution memory such as random access memory (RAM) without being written to non-volatile storage in unprotected form.

In one arrangement, the system may retrieve a private key. The private key may be a private RSA key. The private key may be stored with, or as part of, the EDA application. The private key that is retrieved may also vary according to the particular version number determined from the first N bytes of the encrypted HLL core(s). For example, the system may select one of a plurality of private keys based upon the version number of the encrypted HLL core. The system may use the private key to decrypt the symmetric key from a known location or location(s) within the encrypted HLL core. In one aspect, the system may determine the location or location(s) of the encrypted symmetric key based upon the version number of the encrypted HLL core. Each version number, for example, may be associated with a location or location(s) within the EDA application. The system may then decrypt the encrypted HLL cores using the decrypted symmetric key.

In block 225, the system may generate encrypted intermediate representations (IRs) for encrypted portions of the circuit design. In one arrangement, the system may generate an encrypted IR for each HLL core decrypted in block 220. In one aspect, the encrypted IR may be specified using LLVM IR and encrypted. Each encrypted IR may be a file that may be written to non-volatile memory. In generating the encrypted IRs, the markers for each decrypted HLL core may be propagated through and written to the respective encrypted IRs.

In block 230, the system may generate IRs of unencrypted portions of the circuit design. In one arrangement, the system may generate an IR that is not encrypted for each other file of the circuit design. The IRs generated for unencrypted files of the circuit design may also be specified using LLVM IR, but are not encrypted as compared to the encrypted IRs generated for decrypted HLL cores.

Accordingly, for each decrypted HLL core in volatile memory, the system may generate an encrypted IR. In one aspect, generation of an encrypted IR may be performed responsive to detecting the marker within the decrypted HLL core in volatile memory. For each unencrypted file of the circuit design, the system may generate an IR of the unencrypted file.

In block 235, the system may link the encrypted IRs and the unencrypted IRs into a linked IR. The linked IR may be a single file that may be encrypted. Accordingly, as part of linking, the system may encrypt any unencrypted IRs. Because the linked IR is encrypted, the linked IR may be stored in non-volatile memory. In one arrangement, the linked IR may be stored in volatile memory and, as such, may be used to perform operations including, but not limited to, scheduling, global optimization, and the like. The system, for example, may perform these operations over the entire circuit design. As such, the usability and QoR of the resulting encrypted HDL circuit design is the same as that of a plain text (unencrypted) version of the circuit design.

The operations described herein may be implemented in a way that is transparent to the hardware designer, or user. Any markers propagated through from the encrypted HLL cores are carried forward, or propagated through, to the relevant encrypted IRs and included in the appropriate locations within the linked IR for each encrypted HLL core included therein.

In block 240, the system may generate an encrypted HDL circuit design. The system may convert the linked IR into an encrypted HDL representation of the circuit design referred to as the encrypted HDL circuit design. For example, since each encrypted HLL core is represented within the linked IR, the system may generate an encrypted HDL core that is functionally equivalent to the encrypted HLL core. The encrypted HDL core(s) are included in the resulting encrypted HDL circuit design.

The various usage rights specified by the markers from the linked IR are applied to the encrypted HDL representation. In one aspect, the markers and usage rights specified by the markers are applied to the HDL representation using rights management technologies for HDL known to those skilled in the art. In one aspect, the rights may be applied to, or included within, the relevant HDL cores generated from the original encrypted HLL cores. As the encrypted HDL representation of the circuit design is utilized, the high level synthesis tool recognizes the usage rights as originally specified for the respective HLL cores. The high level synthesis tool enforces the original rights for the HLL cores against the corresponding portions of the encrypted HDL circuit design. In this manner, the original usage rights specified for the HLL core(s) are propagated through to the relevant portions of the HDL representation of the circuit design, e.g., to the generated HDL cores in the encrypted HDL circuit design.

In one or more arrangements, the system may adjust one or more usage rights of the encrypted HLL core according to the source determined in block 215. For example, usage rights of the encrypted HLL core may be increased or decreased according to the particular source identified in block 215. The updated usage right(s) may be written to the marker and propagated through method 200 to the resulting encrypted HDL core generated from the encrypted HLL core within the encrypted HDL circuit design. The updated usage rights may be enforced by the system as a user attempts to utilize the resulting HDL core in the encrypted HDL circuit design. In another example, in the event that the encrypted HLL core is identified as one originating from the system provider, the system may forgo one or more license checks which may be required to be performed by the system for HLL cores from other sources.

Figure 3:
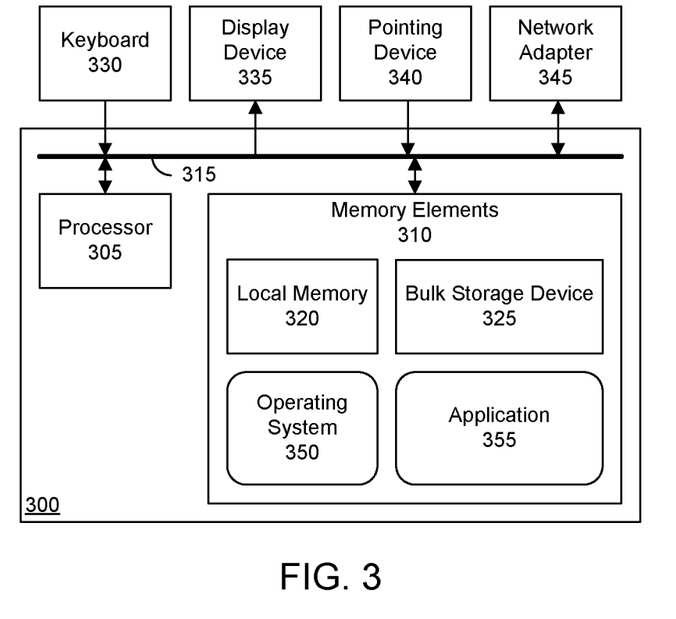
FIG. 3 is a block diagram illustrating an example of a data processing system for use with the inventive arrangements described herein.

FIG. 3 is a block diagram illustrating an exemplary data processing system (system) 300. As pictured, system 300 includes at least one processor, e.g., a central processing unit (CPU), 305 coupled to memory elements 310 through a system bus 315 or other suitable circuitry. System 300 stores computer readable instructions (also referred to as "program code") within memory elements 310. Memory elements 310 may be considered an example of computer readable storage media. Processor 305 executes the program code accessed from memory elements 310 via system bus 315.

Memory elements 310 may include one or more physical memory devices such as, for example, a local memory 320 and one or more bulk storage devices 325. Local memory 320 refers to random access memory (RAM) or other non-persistent (e.g., volatile) memory device(s) generally used during actual execution of the program code. Bulk storage device 325 may be implemented as a hard disk drive (HDD), solid state drive (SSD), or other persistent (non-volatile) data storage device. System 300 may also include one or more cache memories (not shown) that provide temporary storage of at least some program code in order to reduce the number of times program code must be retrieved from bulk storage device 325 during execution.

Input/output (I/O) devices such as a keyboard 330, a display device 335, a pointing device 340, and one or more network adapters 345 may be coupled to system 300. The I/O devices may be coupled to system 300 either directly or through intervening I/O controllers. In some cases, one or more of the I/O devices may be combined as in the case where a touchscreen is used as display device 335. In that case, display device 335 may also implement keyboard 330 and pointing device 340. Network adapter 345 may be used to couple system 300 to other systems, computer systems, remote printers, and/or remote storage devices through intervening private or public networks. Modems, cable modems, Ethernet cards, and wireless transceivers and/or radios are examples of different types of network adapter 345 that may be used with system 300. Depending upon the particular implementation of system 300, the specific type of network adapter, or network adapters as the case may be, will vary.

As pictured in FIG. 3, memory elements 310 may store an operating system 350 and one or more applications 355. Application 355, for example, may be an EDA application. In one arrangement, EDA application may be a high level synthesis application and may include a compiler as described herein. Operating system 350 and application 355, being implemented in the form of executable program code, are executed by system 300 and, in particular, by processor 305 to perform the operations described within this disclosure. As such, operating system 350 and application 355 may be considered an integrated part of system 300. Operating system 350, application 355, and any data items used, generated, and/or operated upon by system 300 are functional data structures that impart functionality when utilized by system 300.

In one aspect, system 300 may be a computer or other device that is suitable for storing and/or executing program code. System 300 may represent any of a variety of computer systems and/or devices that include a processor and memory and that are capable of performing the operations described within this disclosure. In some cases, the particular computer system and/or device may include fewer components or more components than described. System 300 may be implemented as a single system as shown or as a plurality of networked or interconnected systems each having an architecture the same as, or similar to, that of system 300.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing.

As defined herein, a "core" is a reusable unit of logic, cell, chip layout, or circuitry that is the intellectual property of one party. A core may be may be licensed to another party or can be owned and used by a single party alone. A core may be specified in an HDL, as a configuration bitstream, or the like. A core specified in a high level programming language or HLL is referred to as an HLL core.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the term "high level programming language" or "HLL" means a programming language, or set of instructions, used to program a data processing system where the instructions have a strong abstraction from the details of the data processing system, e.g., machine language. For example, a high level programming language may automate or hide aspects of operation of the data processing system such as memory management. The amount of abstraction typically defines how "high level" the programming language is. Using a high level programming language frees the user from dealing with registers, memory addresses, and other low level features of the data processing system upon which the high level programming language will execute. In this regard, a high level programming language includes little or no instructions that translate directly, on a one-to-one basis, into a native opcode of a data processing system. Examples of high level programming languages include, but are not limited to, C, C++, SystemC, OpenCL, or the like.

As defined herein, the term "hardware description language" or "HDL" is a computer-language that facilitates the documentation, design, and manufacturing of a digital system, such as an integrated circuit. A hardware description language, or HDL, combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high level programming languages, an HDL also includes an explicit notion of time, which is a primary attribute of a digital system. HDL may also be referred to as register transfer level (RTL).

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

A computer program product may include a computer readable storage medium (or media) having computer readable program instructions thereon for causing a processor to carry out aspects of the inventive arrangements described herein. Computer readable program instructions described herein may be downloaded to respective computing/processing devices from a computer readable storage medium or to an external computer or external storage device via a network, for example, the Internet, a LAN, a WAN, and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of high level synthesis for a circuit design may include detecting, using a processor, an encrypted HLL core for inclusion in a circuit design, decrypting, using the processor, the encrypted HLL core into volatile memory, and generating, using the processor, an encrypted IR of the circuit design including an encrypted IR of the HLL core. The method may include generating, using the processor, an encrypted HDL circuit design from the encrypted IR of the circuit design. The encrypted HDL circuit design may include an encrypted HDL core that is functionally equivalent to the encrypted HLL core.

Generating an encrypted IR of the circuit design may include generating a first IR of the circuit design that is encrypted corresponding, at least in part, to the encrypted HLL core and generating a second IR of the circuit design that is unencrypted corresponding to an unencrypted portion of the circuit design.

The method may include linking the first IR and the second IR into the encrypted IR of the circuit design.

The encrypted HLL core may include a marker specifying usage rights of the HLL core. The method may include propagating the usage rights of the HLL core to the encrypted IR and to the encrypted HDL core of the encrypted HDL circuit design.

The method may include determining a source of the encrypted HLL core and adjusting a usage right of the encrypted HLL core according to the determined source.

The method may also include first detecting a marker within the HLL core, wherein HLL core is specified as source code and, responsive to detecting the marker, encrypting the HLL core.

Decrypting the HLL core into volatile memory may include decrypting an encrypted symmetric key embedded within the encrypted HLL core using a private key and decrypting the encrypted HLL core using the decrypted symmetric key.

The method may include determining a location of the encrypted symmetric key within the encrypted HLL core from an unencrypted version number of the encrypted HLL core.

A system for high level synthesis of a circuit design may include a processor programmed to initiate executable operations. The executable operations may include detecting an encrypted HLL core for inclusion in a circuit design, decrypting the encrypted HLL core into volatile memory, and generating an encrypted IR of the circuit design including an encrypted IR of the HLL core. The method may also include generating an encrypted HDL circuit design from the encrypted IR of the circuit design, wherein the encrypted HDL circuit design includes an encrypted HDL core that is functionally equivalent to the encrypted HLL core.

Generating an encrypted IR of the circuit design may include generating a first IR of the circuit design that is encrypted corresponding, at least in part, to the encrypted HLL core and generating a second IR of the circuit design that is unencrypted corresponding to an unencrypted portion of the circuit design.

The processor may be further programmed to initiate executable operations including linking the first IR and the second IR into the encrypted IR of the circuit design.

The encrypted HLL core may include a marker specifying usage rights of the HLL core. The processor may be further programmed to initiate executable operations including propagating the usage rights of the HLL core to the encrypted IR and to the encrypted HDL core of the encrypted HDL circuit design.

The processor may be programmed to initiate executable operations including determining a source of the encrypted HLL core and adjusting a usage right of the encrypted HLL core according to the determined source.

The processor may be further programmed to initiate executable operations including first detecting a marker within the HLL core, wherein HLL core is specified as source code and, responsive to detecting the marker, encrypting the HLL core.

Decrypting the HLL core into volatile memory may include decrypting a symmetric key embedded within the encrypted HLL core using a private key and decrypting the encrypted HLL core using the decrypted symmetric key.

The processor may also be programmed to initiate executable operations including determining a location of the encrypted symmetric key within the encrypted HLL core from an unencrypted version number of the encrypted HLL core.

A method of protecting an HLL core may include generating, using a processor, a session key, encrypting, using the processor, the HLL core using the session key, and encrypting, using the processor, the session key using a public key.

The encrypted session key may be included within the encrypted HLL core using the processor.

The method may include detecting a marker specifying usage rights within the HLL core, wherein the HLL core is encrypted responsive to detecting the marker.

The marker may be specified as a compiler directive.

The encrypted session key may be included within the encrypted HLL core at a predetermined location.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of high level synthesis for a circuit design, comprising:
   detecting, using a processor, an encrypted, high level programming language (HLL) core for inclusion in a circuit design;
   decrypting, using the processor, the encrypted HLL core into volatile memory;
   generating, using the processor, an encrypted, intermediate representation of the circuit design comprising an encrypted, intermediate representation of the HLL core by generating a first intermediate representation of the circuit design that is encrypted corresponding, at least in part, to the encrypted HLL core and generating a second intermediate representation of the circuit design that is unencrypted corresponding to an unencrypted portion of the circuit design;
   wherein the intermediate representation is a single static assignment representation; and
   generating, using the processor, an encrypted hardware description language (HDL) circuit design from the encrypted, intermediate representation of the circuit design, wherein the encrypted HDL circuit design comprises an encrypted HDL core that is functionally equivalent to the encrypted HLL core.

2. The method of claim 1, wherein the intermediate representation is LLVM.

3. The method of claim 1, further comprising:
   linking the first intermediate representation and the second intermediate representation into the encrypted, intermediate representation of the circuit design.

4. The method of claim 1, wherein the encrypted HLL core comprises a marker specifying usage rights of the HLL core, the method further comprising:
   propagating the usage rights of the HLL core to the encrypted, intermediate representation and to the encrypted HDL core of the encrypted HDL circuit design.

5. The method of claim 1, further comprising:
   determining a source of the encrypted HLL core; and
   adjusting a usage right of the encrypted HLL core according to the determined source.

6. The method of claim 1, further comprising:
   first detecting a marker within the HLL core, wherein HLL core is specified as source code and, responsive to detecting the marker, encrypting the HLL core.

7. The method of claim 1, wherein decrypting the HLL core into volatile memory comprises:
   decrypting an encrypted symmetric key embedded within the encrypted HLL core using a private key; and
   decrypting the encrypted HLL core using the decrypted symmetric key.

8. The method of claim 7, further comprising:
   determining a location of the encrypted symmetric key within the encrypted HLL core from an unencrypted version number of the encrypted HLL core.

9. A system for high level synthesis of a circuit design, comprising:
   a processor programmed to initiate executable operations comprising:
   detecting an encrypted, high level programming language (HLL) core for inclusion in a circuit design;
   decrypting the encrypted HLL core into volatile memory;
   generating an encrypted, intermediate representation of the circuit design comprising an encrypted, intermediate representation of the HLL core by generating a first intermediate representation of the circuit design that is encrypted corresponding, at least in part, to the encrypted HLL core and generating a second intermediate representation of the circuit design that is unencrypted corresponding to an unencrypted portion of the circuit design;
   wherein the intermediate representation is a single static assignment representation; and
   generating an encrypted hardware description language (HDL) circuit design from the encrypted, intermediate representation of the circuit design, wherein the encrypted HDL circuit design comprises an encrypted HDL core that is functionally equivalent to the encrypted HLL core.

10. The system of claim 9, wherein the intermediate representation is LLVM.

11. The system of claim 9, wherein the processor is further programmed to initiate executable operations comprising:
    linking the first intermediate representation and the second intermediate representation into the encrypted, intermediate representation of the circuit design.

12. The system of claim 9, wherein the encrypted HLL core comprises a marker specifying usage rights of the HLL core, wherein the processor is further programmed to initiate executable operations comprising:
    propagating the usage rights of the HLL core to the encrypted, intermediate representation and to the encrypted HDL core of the encrypted HDL circuit design.

13. The system of claim 9, wherein the processor is further programmed to initiate executable operations comprising:
    determining a source of the encrypted HLL core; and
    adjusting a usage right of the encrypted HLL core according to the determined source.

14. The system of claim 9, wherein the processor is further programmed to initiate executable operations comprising:
    first detecting a marker within the HLL core, wherein HLL core is specified as source code and, responsive to detecting the marker, encrypting the HLL core.

15. The system of claim 9, wherein decrypting the HLL core into volatile memory comprises:

decrypting a symmetric key embedded within the encrypted HLL core using a private key; and decrypting the encrypted HLL core using the decrypted symmetric key.

16. The system of claim 15, wherein the processor is further programmed to initiate executable operations comprising:

determining a location of the encrypted symmetric key within the encrypted HLL core from an unencrypted version number of the encrypted HLL core.

17. A method of high level synthesis for a circuit design, comprising:

detecting, using a processor, an encrypted, high level programming language (HLL) core for inclusion in a circuit design;

decrypting, using the processor, the encrypted HLL core into volatile memory;

generating, using the processor, an encrypted, intermediate representation of the circuit design comprising an encrypted, intermediate representation of the HLL core by generating a first intermediate representation of the circuit design that is encrypted corresponding, at least in part, to the encrypted HLL core and generating a second intermediate representation of the circuit design that is unencrypted corresponding to an unencrypted portion of the circuit design;

wherein the intermediate representation is LLVM representation; and generating, using the processor, an encrypted hardware description language (HDL) circuit design from the encrypted, intermediate representation of the circuit design, wherein the encrypted HDL circuit design comprises an encrypted HDL core that is functionally equivalent to the encrypted HLL core.

18. The method of claim 17, further comprising:

linking the first intermediate representation and the second intermediate representation into the encrypted, intermediate representation of the circuit design.

19. The method of claim 17, wherein the encrypted HLL core comprises a marker specifying usage rights of the HLL core, the method further comprising:

propagating the usage rights of the HLL core to the encrypted, intermediate representation and to the encrypted HDL core of the encrypted HDL circuit design.

20. The method of claim 17, further comprising:

determining a source of the encrypted HLL core; and adjusting a usage right of the encrypted HLL core according to the determined source.

* * * * *